United States Patent [19]

Baader

[11] 3,863,213

[45] Jan. 28, 1975

[54] VARIED CONTROL VEHICLE LIGHT WARNING SYSTEM

[76] Inventor: Joseph E. Baader, 333 Holiday Dr., Springfield, Ohio 45505

[22] Filed: Nov. 9, 1973

[21] Appl. No.: 414,471

Related U.S. Application Data

[63] Continuation-in-part of Ser. No. 335,212, Feb. 23, 1973.

[52] U.S. Cl. .................................................. 340/74
[51] Int. Cl. .............................................. B60q 1/26
[58] Field of Search ............ 340/74, 72, 81; 315/77, 315/82, 83

[56] References Cited
UNITED STATES PATENTS
3,372,373 3/1968 Heidman, Jr. .......................... 340/74

Primary Examiner—Donald J. Yusko

[57] ABSTRACT

A vehicle light warning system, for school buses, operating an eight lamp system of four red and four amber lights, two each in front and rear, operable selectively to indicate initially a slowing down of the vehicle by activating flashing of the amber lights and subsequently, upon door opening, inactivating the amber lights and activating flashing of the red lights to indicate a vehicle stop. Upon door closing all lights are inactivated. The system is also so operable that the door can be open without any lights being activated.

4 Claims, 3 Drawing Figures

VARIED CONTROL VEHICLE LIGHT WARNING SYSTEM

CROSS-REFERENCE TO OTHER APPLICATIONS:

This application is a continuation in part of my copending application, Ser. No. 335,212, filed Feb. 23, 1973, entitled VARIED CONTROL VEHICLE LIGHT WARNING SYSTEM.

This invention constitutes an improvement over that shown in my copending application, Ser. No. 228,531, entitled VEHICLE LIGHT WARNING SYSTEM, filed Feb. 23, 1972.

BACKGROUND OF THE INVENTION

Warning light systems as applied to school buses or the like are subject to state regulation and while the number of lights, their location and timing sequence of flashing illumination are regulated by state authorities, basically such systems require eight lamps including four red and four amber, two each in front and rear, with the amber lights being activated during slowing down of the bus and when the bus has stopped the amber lights are deactivated and the red lights activated. The red lights must be flashingly operated during the period when the bus is stopped and, with the door open, passengers are entering or discharging from the bus. Subsequent to closing of the bus door and prior to moving of the bus, all lights must be inactive. The system also must include control features to inactivate all lights as desired even though the door is open such as when stopping at a railroad crossing.

Heretofore such systems have not been entirely satisfactory in that complex wiring and operating conditions were incorporated and elements of vehicle operator error or forgetfulness were possible. The systems also failed to incorporate adequate operator controls for varying operating conditions. The present system overcomes these drawbacks.

SUMMARY OF THE INVENTION

The invention primarily is for a school bus flasher light circuit in which plural amber lights are activated to flash on and off as the school bus slows and then, as the school bus stops and the door is opened, red lamps, front and rear, flash on and off. Flashing of the amber lights is initially activated by a manually operated momentarily closing initiate switch which, upon slowing of the vehicle, is activated and initiates flashing of the amber warning lights which continues through a relay activation until the vehicle stops and the door is opened which acts to deactivate the amber lights and initiate flashing actuation of the red lights, also by relay action. All lights are then subsequently deactivated when the door is closed and movement of the vehicle resumed. The system and circuit are such, however, that no lights are actuated, regardless of the condition of the door switch unless the initiate switch is closed. Essentially, the system consists of a dual flasher, a single pole single throw grounded relay; two single pole double throw relays with isolated ground; a spring return momentary "on" switch; a door actuated switch; and a diode.

Additional objects and advantages of the invention will be more readily apparent from the following detailed description of an embodiment thereof when taken together with the accompanying drawing in which.

Figure 1:
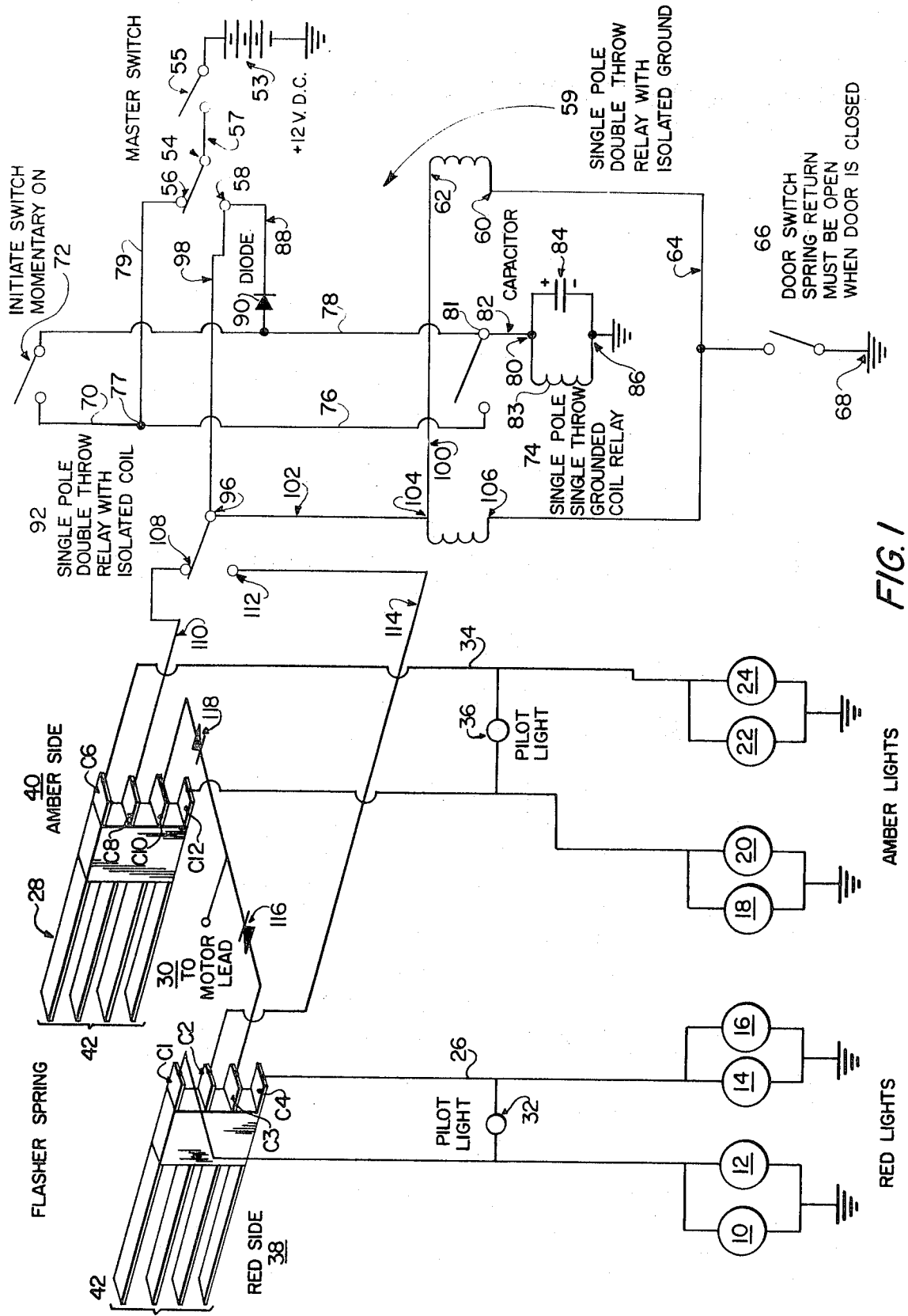
FIG. 1 is a schematic diagram of a circuit in accordance with the invention.

Referring now in greater detail to the drawing, the system, as required for school buses, employs a set of eight warning lights which are physically positioned in sets of four on the front and rear of the bus, each end of the bus having two amber and two red lights. The system is operated on the normal twelve volt DC electrical system. In the simplified schematic shown in FIG. 1 of the drawings, the red lights are designated at 10, 12, 14 and 16 and the amber lights at 18, 20, 22 and 24. It is understood that two of the red lights and two of the amber lights are physically positioned both at the rear and front of the vehicle. The red lights are operatively connected through wiring 26 to a dual flasher unit 28 which is motor actuated by motor 30, both of which will be described in greater detail hereinafter, and a pilot light 32 is included in the circuit to indicate operation. The amber lights are connected to dual flasher 28 by wiring 34 and the circuit includes operating pilot light 36.

Figure 2:
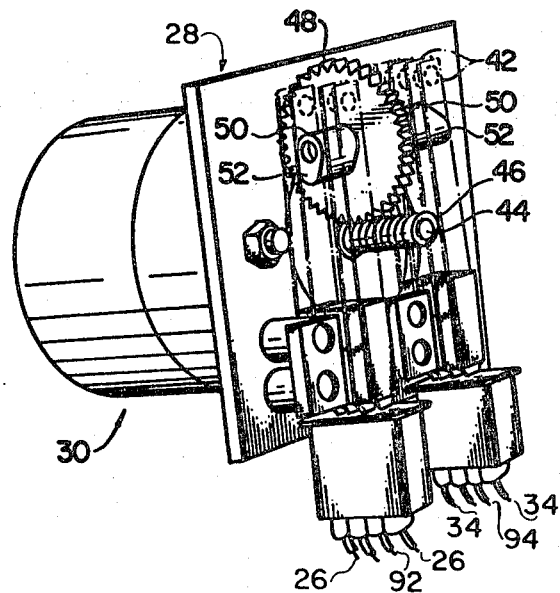
FIG. 2 is an end perspective view of a dual flasher cam operating light actuator in the system.
Figure 3:
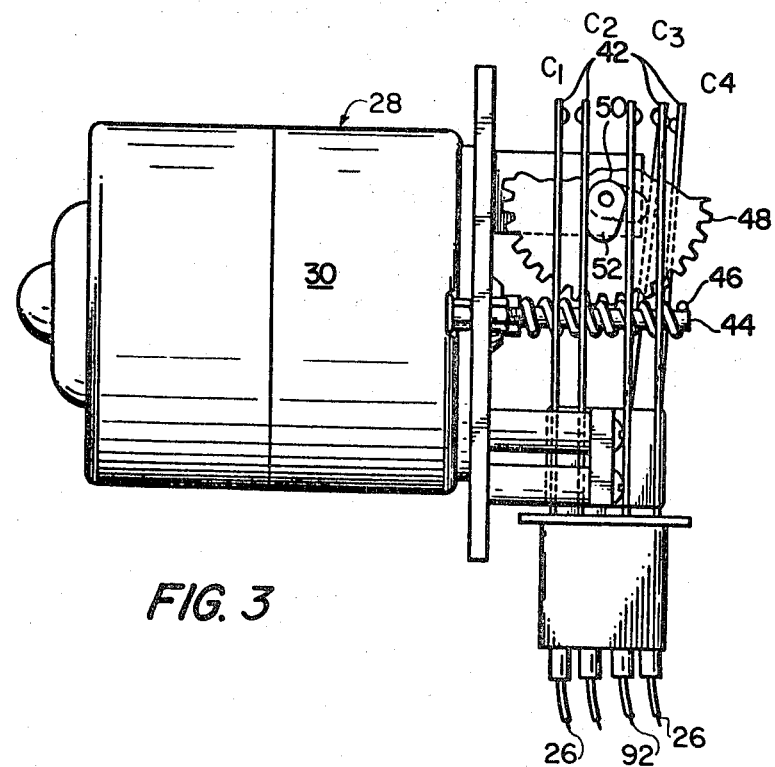
FIG. 3 is a side elevational view of a dual flasher.

The dual flasher, as schematically shown in FIG. 1, includes a red side 38 and an amber side 40 for actuating the red and amber lights in a flashing mode of operation respectively. The red side includes a plurality of contacts C1, C2, C3 and C4 and amber side 40 includes a plurality of contacts C6, C8, C10 and C12. These contacts are carried, respectively, on spring fingers or the like generally indicated at 42 and the contacts are respectively operable preferably by means of motor 30, which has a solid state field, and an output shaft 44 with a worm gear 46 operatively drivingly engaging a toothed wheel 48 which in turn serves to rotate opposed arms 50 having cams 52 thereon in the nature of lobes or projections interleaved between spring fingers 42, all as shown in greater detail in FIGS. 2 and 3. Upon operation of the motor the cams operate to selectively interengage various of the contacts which is possible through bending of the spring fingers by the cams as schematically shown in FIG. 3.

The system is connected to the vehicle electrical system, including the usual 12 volt battery 53 grounded as shown with the circuit including a master cutoff switch and fuse generally indicated at 55, and connected by wire 57 to a single pole, double throw relay 59 with isolated ground. This relay includes a rotor 54 and contacts 56, 58, 60 and 62. Contact 60 is connected through lead or wire 64 through a plunger type, momentary on, spring return door switch 66 which is grounded as at 68 to the vehicle and which must be open when the vehicle door is closed.

A spring return momentary "on" initiate switch 70 having an operating control arm 72 is provided and is connected to a single pole, single throw grounded coil relay 74 through leads 76 and 78 as shown. A contact 77 is connected through lead 79 to contact 56 of 59.

Relay 74 has contacts 80 and 81 interconnected as shown at 82. A capacitor 84 is connected in parallel with coil 83 and then to ground at 86. Contact 80 is connected through lead 88 to contact 58 of relay 59 with the interposition of a single acting direction diode as at 90.

The system includes a single pole double throw relay 92, with isolated coil, with rotor 96 thereof connected by lead 98 to contact 58 of relay 59, and additionally, through lead 100 to contact 62 of relay 59. Rotor 96 is also operatively connected by lead 102 to contact 104 of relay 92. Contact 106 of relay 92 is connected into lead 64 to door switch 66. Contact 108 of relay 92 is connected by lead 110 to contact C8 of flasher unit 28 in amber side 40 and contact 112 of relay 92 is connected through lead 114 to contact C2 on red side 38 of flasher unit 28.

Two diodes 116 and 118 are connected in the motor circuit lead of motor 30 for reasons pointed out hereinafter.

The system is so designed that when momentary switch 70 is closed relay 74 is energized and accomplishes two functions, namely, it locks itself "on" or is energized and supplies current to the terminal of relay 92 which can function to turn on the amber lights. However, to operate the door switch 66 must be open or, in other words, the door closed. When the door is opened, or door switch 66 closed, this grounds the coils of relays 50 and 92. Thus, in relay 92 rotor 96 moves from contact 108 to contact 112 which supplies current to the red side 38 of door flasher 28 and at the same time in relay 50 rotor 54 moves from contact 56 to contact 58 which supplies current directly to rotor 96 of relay 92 and this bypasses relay 74. Now, diode 90 is reversed biased and this does not allow current to flow to relay 74 which de-energizes relay 74. When the door is closed, switch 66 opened, relays 59 and 92 lose ground connection and thus are de-energized. The red lights cannot be turned on until the momentary switch 70 is closed.

Since a single motor is used for the motor driven flasher for the amber and red lights, it would be possible to have current feed back to the other set of lights. This effect is negated by using the two diodes 116 and 118 in the motor circuit. When the amber lights are given power, current flows through diode 118 to the motor but diode 116 is reversed biased, not allowing current to flow to the red light. When the red lights are given power, current flows through diode 116 to the motor and diode 118 is reversed biased and no current flows to the amber lamps. Isolation of the amber and red lamps is thus achieved.

The master cut-off and switch 55 serves to cut off contact between rotor 54 of relay 59 and battery 53. This will cut off all power to the circuits of the system.

The cycle is started by momentarily closing initiate switch 70 and this energizes relay 74 which immediately locks itself on, connecting relay 92 to the battery 53 through relay 59. With the door of the vehicle closed, the amber lights are selected by relay 92.

When the door of the vehicle is opened, the door switch 66 grounds both relays 92 and 59. Relay 92 now selects the red lamps and relay 59 bypasses relay 74 with the battery. When relay 74 is bypassed by relay 59, it loses power because diode 90 is now reversed biased and will not permit relay 74 to obtain power. As long as the door is open, door switch 66 being closed, the red lamps will operate. When the vehicle door is closed, the door switch 66 is opened and, consequently, relays 59 and 92 lose ground and return to their initial positions. Relay 59 feeds power to relay 74, not now bypassing it, and relay 92 selects the amber lights, but relay 92 has no power since relay 74 has been turned off and the system is returned to its initial state.

Relay 92 cannot receive any power and, therefore, no lights can be lit no matter what position door switch 66 is in and the only way that any lights can be actuated or lighted is to throw or close the initiate switch 70.

If, for example, the vehicle door is open, the door switch 66 being closed, and initiate switch 70 has not been thrown or closed, nothing will happen. Since the door switch 66 has selected the red lights, when the initiate switch 70 is now thrown, relay 59 bypasses relay 74, relay 92 is turned on and the red lights will flash.

It will be seen from the foregoing that various modes of operation of the different lights can be effected selectively and controlled for different operational phases or requirements of the vehicle.

Manifestly, minor changes can be effected without departing from the spirit and scope of the invention as defined in and limited solely by the appended claims:

I claim:

1. In a vehicle light warning system having a door, caution indicating lights and stop indicating lights mounted on the vehicle, and an electric circuit on the vehicle incorporating said lights for selective operation thereof:

A. an electric power source in said circuit;

B. a caution light circuit having said caution light indicating lights therein;

C. a stop light circuit having said stop indicating lights therein;

D. a single motor driven dual flasher means including first and second sets of contacts respectively operatively connected with said caution and stop light circuits for selective flashing actuation thereof;

E. a single pole, double throw first relay with isolated ground in said circuit including a rotor and plural contacts;

F. a vehicle grounded momentary on spring return door switch open when said door is closed connected to one said contact of said isolated ground relay;

G. a single pole, single throw grounded coil second relay in said circuit having a plurality of contacts;

H. a spring return momentary on initiate switch in said circuit having an operating control arm and connected by leads to contacts of said grounded coil relay, and to a contact of said isolated ground relay;

I. two contacts of said grounded coil relay being interconnected, and a capacitor connected in parallel with said coil and then to ground through said door switch, and a contact being connected by a lead to a contact of said isolated ground relay with a single acting direction diode interconnected in said lead;

J. a single pole double throw third relay having a plurality of contacts, with isolated coil in said circuit including a rotor connected by a lead to contact of said isolated ground relay, and through a lead to a second contact of said isolated ground relay, said rotor being connected by a lead to a contact of said isolated coil relay, a contact of said relay being connected to said door switch, a contact connectable to a contact of said first set of flasher contacts, and a contact connectable to a contact of said second set of flasher contacts; and K. two single acting diodes connected respectively in motor circuit leads to said respective contact sets.

2. A system as claimed in claim 1, wherein a lighting cycle is initiated by momentarily closing said initiate switch which energizes said second relay, which acts to lock in operative condition, thereby connecting said third relay to said power source through said first relay and with the vehicle door closed the caution light being selected through said third relay.

3. A system as claimed in claim 2, wherein upon opening the vehicle door said door switch grounds both said third and first relays and said third relay selects said stop light circuit and said first relay bypasses said second relay with said power source, whereby said second relay loses power due to reversed bias of said diode and preventing said second relay from receiving power, said stop light circuit being energized with said door switch closed.

4. A system as claimed in claim 3, said initiate switch being operable to master control the light circuits and prevent actuation regardless of the condition of said door switch with said third relay being de-energized until said initiate switch is actuated.

* * * * *